United States Patent
Srinivasan et al.

(10) Patent No.: US 11,938,929 B2
(45) Date of Patent: Mar. 26, 2024

(54) OBSTACLE AVOIDANCE FOR VEHICLE WITH TRAILER

(71) Applicant: Ford Global Technologies, LLC, Dearborn, MI (US)

(72) Inventors: Mohit Srinivasan, Ann Arbor, MI (US); Hongtei Eric Tseng, Canton, MI (US); Li Xu, Northville, MI (US); Craig Philip Angold-Stephens, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 17/551,228

(22) Filed: Dec. 15, 2021

(65) Prior Publication Data
US 2023/0182721 A1 Jun. 15, 2023

(51) Int. Cl.
*B60W 30/09* (2012.01)
*B60W 10/18* (2012.01)
*B60W 10/20* (2006.01)
*B60W 30/095* (2012.01)
*B60W 60/00* (2020.01)
*G06F 17/11* (2006.01)
*G06V 20/58* (2022.01)

(52) U.S. Cl.
CPC ............ *B60W 30/09* (2013.01); *B60W 10/18* (2013.01); *B60W 10/20* (2013.01); *B60W 30/095* (2013.01); *B60W 60/0011* (2020.02); *G06F 17/11* (2013.01); *G06V 20/58* (2022.01); *B60W 2300/14* (2013.01)

(58) Field of Classification Search
CPC ....... G06F 17/11; B60W 10/18; B60W 10/20; B60W 2300/14; B60W 2300/145; B60W 30/09; B60W 30/095; B60W 30/0953; B60W 30/0956; B60W 60/0011; G06V 20/58; B60Y 2300/28
See application file for complete search history.

(56) References Cited

U.S. PATENT DOCUMENTS 8,849,515 B2 9/2014 Moshchuk et al.
2011/0202238 A1* 8/2011 Cebon .................... B62D 13/04
701/41

(Continued)

FOREIGN PATENT DOCUMENTS

CN 111897213 A 11/2020

OTHER PUBLICATIONS

Srinivasan et al., "Extent-Compatible Control Barrier Functions", Preprint submitted to Journal of LATEX Templates, May 5, 2021.

*Primary Examiner* — John M Zaleskas
(74) *Attorney, Agent, or Firm* — Frank A. Mackenzie; Bejin Bieneman PLC (57) ABSTRACT

A computer includes a processor and a memory, and the memory stores instructions executable by the processor to receive sensor data indicating an obstacle, formulate a first control barrier function for a vehicle based on the sensor data, formulate a second control barrier function for a trailer hitched to the vehicle based on the sensor data, determine a control input based on the first and second control barrier functions, and actuate a component of the vehicle according to the control input.

20 Claims, 3 Drawing Sheets

(56) References Cited

U.S. PATENT DOCUMENTS

| | | | | |
|---|---|---|---|---|
| 2013/0179038 | A1* | 7/2013 | Goswami | B62D 5/04 |
| | | | | 701/42 |
| 2014/0032049 | A1* | 1/2014 | Moshchuk | G08G 1/166 |
| | | | | 701/42 |
| 2016/0362135 | A1* | 12/2016 | Xu | B62D 13/06 |
| 2017/0073005 | A1* | 3/2017 | Ghneim | B62D 13/06 |
| 2017/0120903 | A1* | 5/2017 | Lavoie | B60W 30/06 |
| 2018/0111621 | A1* | 4/2018 | Buss | B60W 40/10 |
| 2018/0118199 | A1* | 5/2018 | Chaney, Jr. | B60W 10/20 |
| 2019/0061817 | A1* | 2/2019 | Mattern | B62D 6/002 |
| 2019/0077454 | A1* | 3/2019 | Stroebel | B60W 50/14 |
| 2019/0161118 | A1* | 5/2019 | Greenwood | G08G 1/142 |
| 2019/0367021 | A1* | 12/2019 | Zhao | B60W 60/0011 |
| 2019/0367022 | A1* | 12/2019 | Zhao | B60W 30/18154 |
| 2020/0001920 | A1* | 1/2020 | Hejase | B60W 30/18036 |
| 2020/0142405 | A1* | 5/2020 | Havens | B62D 15/025 |
| 2020/0353918 | A1 | 11/2020 | Goto et al. | |
| 2020/0398823 | A1* | 12/2020 | Oba | B62D 53/00 |
| 2021/0237769 | A1* | 8/2021 | Ostafew | G08G 1/167 |
| 2021/0365596 | A1* | 11/2021 | Heersink | G06N 3/08 |
| 2022/0126876 | A1* | 4/2022 | Tebbens | G05D 1/0088 |
| 2022/0396271 | A1* | 12/2022 | Lewandowski | B60W 10/20 |
| 2023/0020503 | A1* | 1/2023 | Rahman | G05D 1/0221 |
| 2023/0099598 | A1* | 3/2023 | Mehra | B60W 30/0956 |
| | | | | 701/93 |
| 2023/0150485 | A1* | 5/2023 | Hafner | B60W 40/06 |
| | | | | 701/301 |
| 2023/0150532 | A1* | 5/2023 | Hafner | B60W 30/0953 |
| | | | | 701/23 |

* cited by examiner

OBSTACLE AVOIDANCE FOR VEHICLE WITH TRAILER

BACKGROUND

Motor vehicles are sometimes used to tow trailers. A trailer is an unpowered vehicle outfitted to be towed by a powered vehicle. A trailer can be unpowered by lacking a propulsion or can be temporarily unpowered, e.g., by being in a neutral gear. Trailers can be used to transport goods, provide living space, etc.

DETAILED DESCRIPTION

The system and techniques described herein may prevent a collision between an obstacle and both a vehicle and a trailer being towed by the vehicle. This task can be difficult for an operator of the vehicle, particularly when operating the vehicle in reverse. For example, the system can actuate the vehicle, e.g., a brake system or steering system, to avoid the obstacle entering respective buffer zones surrounding the vehicle and the trailer. Specifically, the two buffer zones can be represented by respective control barrier functions. For example, a computer can formulate the control barrier functions for the vehicle and for the trailer, determine a control input for the brake system and/or steering system based on the control barrier functions, and actuate the brake system and/or steering system according to the control input. As described further below, the present system can thus allow a vehicle with a trailer to avoid obstacles with improved efficiency. The control barrier functions provide a computationally efficient manner for the computer to determine the control input.

A computer includes a processor and a memory, and the memory stores instructions executable by the processor to receive sensor data indicating an obstacle, formulate a first control barrier function for a vehicle based on the sensor data, formulate a second control barrier function for a trailer hitched to the vehicle based on the sensor data, determine a control input based on the first and second control barrier functions, and actuate a component of the vehicle according to the control input.

The component of the vehicle may include a brake system.

The component of the vehicle may include a steering system.

Determining the control input may include solving a quadratic program based on the first and second control barrier functions.

Determining the control input may be based on minimizing a function of a difference between the control input and a nominal input. The nominal input may be a current value of input.

The instructions may further include instructions to receive the nominal input from an algorithm for autonomous operation of the vehicle.

Determining the control input may be subject to a first constraint based on the first control barrier function and a second constraint based on the second control barrier function. The first constraint may be that a sum of a time derivative of the first control barrier function and a first function of the first control barrier function exceeds a first value, and the second constraint may be that a sum of a time derivative of the second control barrier function and a second function of the second control barrier function exceeds a second value. The first function is locally Lipschitz continuous, and the second function is locally Lipschitz continuous.

The first function may be strictly increasing and equal to zero when an argument of the first function is equal to zero, and the second function may be strictly increasing and equal to zero when an argument of the second function is equal to zero.

The first function and the second function may be the same.

The first value may be zero, and the second value may be zero.

The control input may be subject to a third constraint, and the third constraint may be that the control input is below a maximum value.

Actuating the component according to the control input may occur in response to the vehicle being in a reverse gear. The instructions may further include instructions to refrain from actuating the component according to the control input in response to the vehicle being in a gear other than the reverse gear.

The instructions may further include instructions to, while the vehicle is in a reverse gear, repeatedly (a) formulate the first and second control barrier functions, (b) determine the control input subject to the first and second control barrier functions, and (c) actuate the component according to the control input.

The instructions may further include instructions to determine a vehicle kinematic state of the vehicle and a trailer kinematic state of the trailer, the first control barrier function may be based on the vehicle kinematic state, and the second control barrier function may be based on the trailer kinematic state. The trailer kinematic state may be dependent on the vehicle kinematic state.

A method includes receiving sensor data indicating an obstacle, formulating a first control barrier function for a vehicle based on the sensor data, formulating a second control barrier function for a trailer hitched to the vehicle based on the sensor data, determining a control input based on the first and second control barrier functions, and actuating a component of the vehicle according to the control input.

With reference to the Figures, wherein like numerals indicate like parts throughout the several views, a computer 102 includes a processor and a memory, and the memory stores instructions executable by the processor to receive sensor data indicating an obstacle 104, formulate a first control barrier function for a vehicle 100 based on the sensor data, formulate a second control barrier function for a trailer 106 hitched to the vehicle 100 based on the sensor data, determine a control input based on the first and second control barrier functions, and actuate a component of the vehicle 100 according to the control input.

Figure 1:
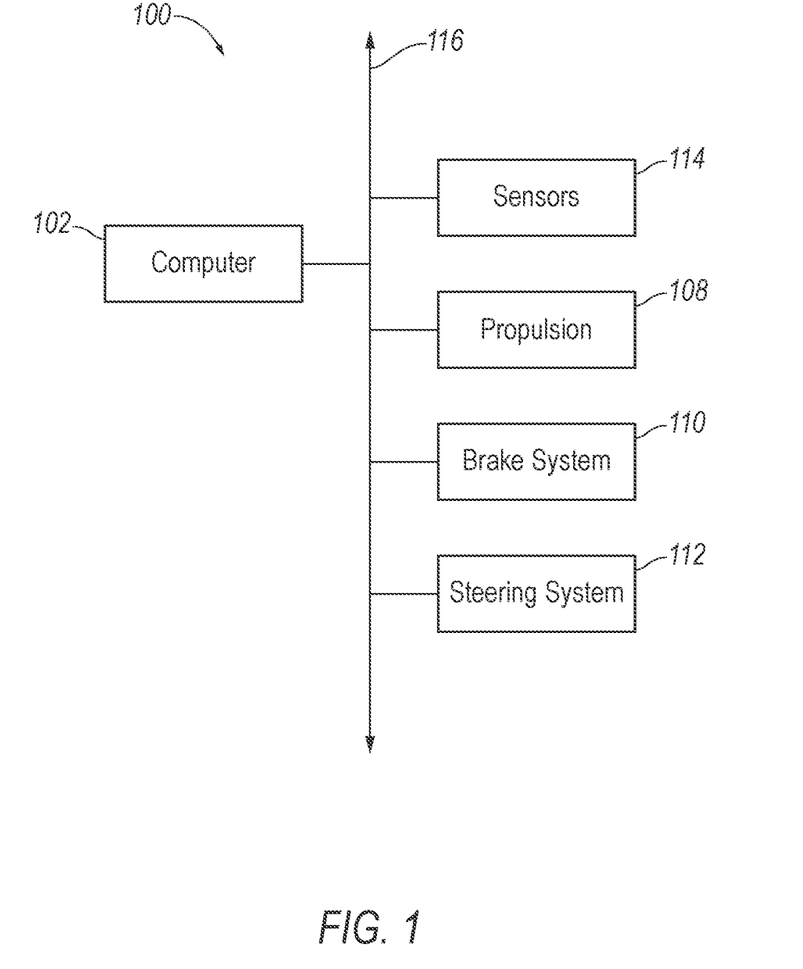
FIG. 1 is a block diagram of an example vehicle.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. The computer 102 can be programmed to operate the vehicle 100 independently of the intervention of a human operator, completely or to a lesser degree. The computer 102 may be programmed to operate a propulsion 108, a brake system 110, a steering system 112, and/or other vehicle systems based on data from sensors 114. For the purposes of this disclosure, autonomous operation means the computer 102 controls the propulsion 108, brake system 110, and steering system 112 without input from a human operator; semi-autonomous operation means the computer 102 controls one or two of the propulsion 108, brake system 110, and steering system 112 and a human operator controls the remainder; and nonautonomous operation means a human operator controls the propulsion 108, brake system 110, and steering system 112.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 116 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the sensors 114, the propulsion 108, the brake system 110, the steering system 112, and other components via the communications network 116.

The sensors 114 may provide data about operation of the vehicle 100, for example, wheel speed, wheel orientation, and engine and transmission data (e.g., temperature, fuel consumption, etc.). The sensors 114 may detect the location and/or orientation of the vehicle 100. For example, the sensors 114 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 114 may detect the external world, e.g., objects and/or characteristics of surroundings of the vehicle 100, such as other vehicles, road lane markings, traffic lights and/or signs, pedestrians, etc. For example, the sensors 114 may include radar sensors, scanning laser range finders, light detection and ranging (LIDAR) devices, and image processing sensors such as cameras.

The propulsion 108 of the vehicle 100 generates energy and translates the energy into motion of the vehicle 100. The propulsion 108 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 108 can include an electronic control unit (ECU) or the like that is in communication with and receives input from the computer 102 and/or a human operator. The human operator may control the propulsion 108 via, e.g., an accelerator pedal and/or a gear-shift lever.

The brake system 110 is typically a conventional vehicle braking subsystem and resists the motion of the vehicle 100 to thereby slow and/or stop the vehicle 100. The brake system 110 may include friction brakes such as disc brakes, drum brakes, band brakes, etc.; regenerative brakes; any other suitable type of brakes; or a combination. The brake system 110 can include an electronic control unit (ECU) or the like that is in communication with and receives input from the computer 102 and/or a human operator. The human operator may control the brake system 110 via, e.g., a brake pedal.

The steering system 112 is typically a conventional vehicle steering subsystem and controls the turning of the wheels. The steering system 112 may be a rack-and-pinion system with electric power-assisted steering, a steer-by-wire system, as both are known, or any other suitable system. The steering system 112 can include an electronic control unit (ECU) or the like that is in communication with and receives input from the computer 102 and/or a human operator. The human operator may control the steering system 112 via, e.g., a steering wheel.

Figure 2:
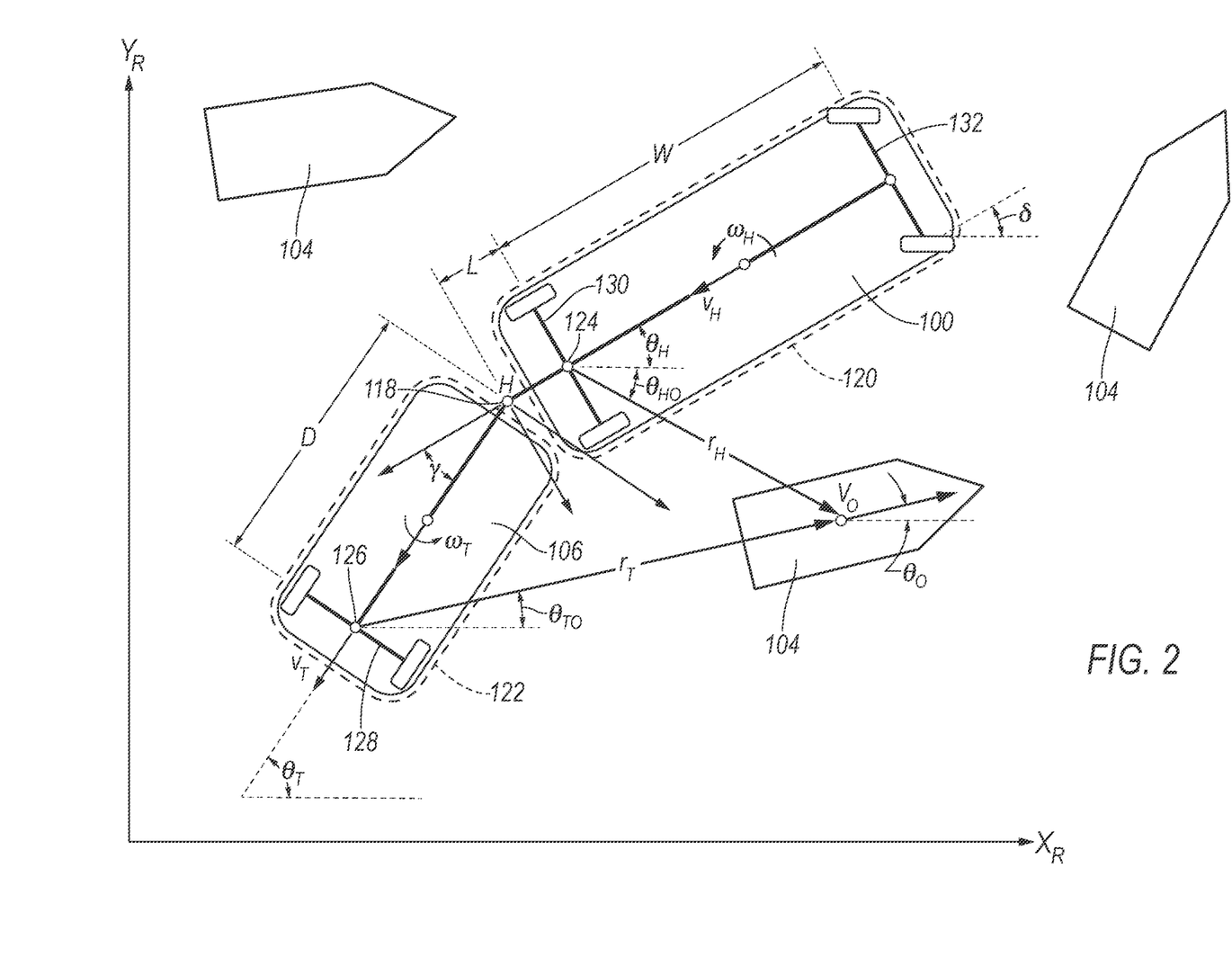
FIG. 2 is a diagrammatic top view of the vehicle with an example trailer.

With reference to FIG. 2, the vehicle 100 is towing the trailer 106. The trailer 106 can be an unpowered vehicle outfitted to be towed by the vehicle 100. The trailer 106 can be unpowered by lacking a propulsion or can be temporarily unpowered, e.g., by being in a neutral gear. The trailer 106 can be used to transport goods, provide living space, etc. The trailer 106 can include a single axle 128 or two or more axles 128 adjacent to each other.

The trailer 106 can be hitched to the vehicle 100. For example, the vehicle 100 and the trailer 106 can be connected by a tow hitch 118, also referred to as a trailer hitch. The tow hitch 118 can be any suitable type, e.g., a tow ball and socket, a fifth wheel and gooseneck, etc. The tow hitch 118 permits rotation of the trailer 106 relative to the vehicle 100 around a vertical axis H, e.g., passing through the tow ball, as seen in FIG. 2. The tow hitch 118 can rigidly connect the vehicle 100 and the trailer 106 to the point through which the vertical axis H passes.

The computer 102 can be programmed to determine a vehicle kinematic state of the vehicle 100. For the purposes of this disclosure, a "kinematic state" is defined as a mathematical description of the position and/or motion of an entity. For example, the vehicle kinematic state can include a position, a heading, a velocity vector, and a yaw rate. The position of the vehicle 100 can be the position of a predefined point 124 of the vehicle 100, e.g., the center of gravity or the center of a rear axle 130. The components of the velocity vector of the vehicle 100 can be given by the following equations:

$$\dot{x}_H = v_H \cos\theta_H$$

$$\dot{y}_H = v_H \sin\theta_H$$

in which $(x_H, y_H)$ is the position of the vehicle 100, the dot above a variable indicates a time derivative, $v_H$ is the longitudinal velocity, i.e., speed, of the vehicle 100, and $\theta_H$ is the heading of the vehicle 100. The yaw rate of the vehicle 100 can be given by the following equation:

$$\dot{\theta} = \omega_H = \frac{v_H \tan \delta}{W}$$

in which δ is the steering angle of the vehicle 100 and W is the wheelbase of the vehicle 100, i.e., the longitudinal distance between a front axle 132 and the rear axle 130.

The computer 102 can be programmed to determine the vehicle kinematic state based on sensor data from the sensors 114. For example, the sensors 114 can return the position from a GPS sensor, the speed $v_H$ of the vehicle 100 from wheel speed sensors, the heading $\theta_H$ of the vehicle 100 from an IMU, and the steering angle δ from the steering system 112.

The computer 102 can be programmed to determine a trailer kinematic state of the trailer 106. For example, the trailer kinematic state can include a position, a heading, a velocity vector, and a yaw rate. The position of the trailer 106 can be the position of a predefined point 126 of the trailer 106, e.g., the center of gravity or the center of the single axle 128. The trailer kinematic state can be dependent on the vehicle kinematic state. For example, the speed of the trailer 106 can be a function of the speed of the vehicle 100, the yaw rate of the vehicle 100, and the difference in headings between the vehicle 100 and the trailer 106, e.g., as given by the following equation:

$$v_T = v_H \cos \gamma - L\omega_H \sin \gamma$$

in which γ is the difference in headings between the vehicle 100 and the trailer 106, i.e., the hitch angle, and L is the longitudinal distance (relative to the vehicle 100) between the rear axle 130 of the vehicle 100 and the pivot point of the tow hitch 118 around the vertical axis H. The components of the velocity vector of the trailer 106 can be given by the following equations:

$$\dot{x}_T = v_T \cos \theta_T$$

$$\dot{y}_T = v_T \sin \theta_T$$

in which $\theta_T$ is the heading of the trailer 106. The yaw rate of the trailer 106 can be a function of the speed of the vehicle 100, the yaw rate of the vehicle 100, and the difference in headings between the vehicle 100 and the trailer 106, e.g., as given by the following equation:

$$\dot{\theta} = \omega_T = -\frac{v_H \sin \gamma}{D} - \frac{L\omega_H \cos \gamma}{D}$$

in which D is the longitudinal distance (relative to the trailer 106) between the axle 128 of the trailer 106 and the pivot point of the tow hitch 118 around the vertical axis H.

The computer 102 can be programmed to determine the trailer kinematic state based on sensor data from the sensors 114. For example, the sensors 114 can return the speed $v_H$ of the vehicle 100 from wheel speed sensors, the yaw rate $\omega_H$ of the vehicle 100 from the vehicle kinematic state determined above, the difference in headings γ from camera data, and the heading $\theta_T$ of the trailer 106 from the heading $\theta_H$ of the vehicle 100 and the difference in headings γ.

The computer 102 can be programmed to actuate a component of the vehicle 100 according to an input. For the purposes of this disclosure, an "input" is one or more values that control operation of a component of the vehicle 100. For example, the component can be the brake system 110, and the input can include the speed $v_H$ of the vehicle 100. Actuating the brake system 110 according to the input of the speed $v_H$ of the vehicle 100 can include engaging the brake system 110 until the speed $v_H$ drops to the speed $v_H$ specified in the input. For another example, the component can be the steering system 112, and the input can include the steering angle δ. Actuating the steering system 112 according to the input of the steering angle δ can include turning the wheels until the wheels are oriented at the steering angle δ.

The computer 102 can be programmed to receive a nominal input. The nominal input can be a current value of the input. For example, if an operator is manually operating the vehicle 100, the nominal input can be the current values of the values forming the input, e.g., current values of the speed $v_H$ of the vehicle 100 and/or the steering angle δ. For another example, if the computer 102 is operating the vehicle 100 autonomously, the nominal input can be values commanded by an algorithm for autonomous operation of the vehicle 100. The computer 102 can receive the nominal input from the algorithm. In the absence of a control input (determined as will be described below), the computer 102 can be programmed to actuate the components of the vehicle 100 according to the nominal input.

The computer 102 can be programmed to receive sensor data from the sensors 114 indicating one or more obstacles 104. The sensor data can include positions, headings, velocity vectors, and/or contours of the obstacles 104. In other words, the sensor data can define an obstacle kinematic state. For example, the position of the obstacle 104 can be represented as a distance $r_H$ from the predefined point 124 of the vehicle 100 to the obstacle 104 and a direction $\theta_{HO}$ from the predefined point 124 of the vehicle 100 to the obstacle 104, and/or the position of the obstacle 104 can be represented as a distance $r_T$ from the predefined point 126 of the trailer 106 and a direction $\theta_{TO}$ from the predefined point 126 of the trailer 106 to the obstacle 104. The velocity vector can be represented by a speed $v_O$ of the obstacle 104 and a heading Bo of the obstacle 104.

The computer 102 can be programmed to formulate a first control barrier function $h_H$ for the vehicle 100 based on the sensor data, i.e., based on the obstacle 104. The first control barrier function $h_H$ can be a difference between the distance $r_H$ from the predefined point 124 of the vehicle 100 to the obstacle 104 and a point on a first virtual boundary 120 in the direction $\theta_{HO}$ from the predefined point 124 of the vehicle 100 to the obstacle 104. The first virtual boundary 120 can be represented as a function $\Gamma_H$ of the direction $\theta_{HO}$ that returns a distance from the predefined point 124 of the vehicle 100 in the direction $\theta_{HO}$ to the first virtual boundary 120. The first control barrier function $h_H$ can be a function of the vehicle 100 kinematic state and the obstacle kinematic state. The first control barrier function $h_H$ need not be a function of the trailer kinematic state. For example, the first control barrier function $h_H$ can be represented by the following equation:

$$h_H(r_H, \theta_H, \theta_{HO}, \theta_O, v_H, v_O) = r_H - \Gamma(\theta_{HO})$$

The computer 102 can be programmed to formulate a second control barrier function $h_T$ for the trailer 106 based on the sensor data, i.e., based on the obstacle 104. The second control barrier function $h_T$ can be a difference between the distance $r_T$ from the predefined point 126 of the trailer 106 to the obstacle 104 and a point on a second virtual boundary 122 in the direction $\theta_{TO}$ from the predefined point 126 of the trailer 106 to the obstacle 104. The second virtual boundary 122 can be represented as a function $\Gamma_T$ of the direction $\theta_{TO}$ that returns a distance from the predefined point 126 of the trailer 106 in the direction $\theta_{TO}$ to the second virtual boundary 122. The second control barrier function $h_T$ can be a function of the trailer kinematic state and the obstacle kinematic state. The second control barrier function $h_T$ need not be a direct function of the vehicle kinematic state. For example, the second control barrier function $h_T$ can be represented by the following equation:

$$h_T(r_T, \theta_T, \theta_{TO}, \theta_O, v_T, v_O) = r_T - \Gamma(\theta_{TO})$$

The control barrier functions $h_H$, $h_T$ provide a computationally efficient manner for the computer to determine the control input, described below. For example, the computer can determine constraints based on the control barrier functions and solve an optimization problem subject to the constraints using a quadratic program, as will be described in turn. Quadratic programming is an efficient technique for solving the optimization problem, and the use of the control barrier functions permits formulation of the optimization problem in the manner required for quadratic programming.

Determining the control input (described below) can be subject to a first constraint based on the first control barrier function $h_H$. The first constraint can be that a sum of a time derivative of the first control barrier function $h_H$ and a first function $\alpha(\cdot)$ of the first control barrier function $h_H$ exceeds a first value. The first value can be zero. For example, the first constraint can be represented by the following equation:

$$\dot{h}_H + \alpha(h_H) \geq 0$$

The first function $\alpha(\cdot)$ can be locally Lipschitz continuous, i.e., within a range of the first function $\alpha(\cdot)$ that is implicated by the first constraint, the absolute value of the slope between any two points is not greater than a predefined real number. In other words, there is a maximum rate of change of the first function $\alpha$ with respect to the first control barrier function $h_H$. The first function $\alpha(\cdot)$ can be a class $\kappa$ function, i.e., is strictly increasing and is equal to zero when the argument is zero, i.e., $\alpha(0)=0$. The first function $\alpha(\cdot)$ can be chosen to cause the component of the vehicle 100 to actuate in time to prevent the vehicle 100 from contacting the obstacle 104.

Determining the control input (described below) can be subject to a second constraint based on the second control barrier function $h_T$. The second constraint can be that a sum of a time derivative of the second control barrier function $h_T$ and a second function $\alpha(\cdot)$ of the second control barrier function $h_T$ exceeds a second value. The second value can be zero. For example, the second constraint can be represented by the following equation:

$$\dot{h}_T + \alpha(h_T) \geq 0$$

The first function and the second function can be the same, and are herein both represented by $\alpha(\cdot)$. The second function $\alpha(\cdot)$ can be locally Lipschitz continuous, i.e., within a range of the second function $\alpha(\cdot)$ that is implicated by the second constraint, the absolute value of the slope between any two points is not greater than a predefined real number. In other words, there is a maximum rate of change of the second function $\alpha$ with respect to the second control barrier function $h_T$. The second function $\alpha(\cdot)$ can be a class $\kappa$ function, i.e., is strictly increasing and is equal to zero when the argument is zero, i.e., $\alpha(0)=0$. The second function $\alpha(\cdot)$ can be chosen to cause the component of the vehicle 100 to actuate in time to prevent the trailer 106 from contacting the obstacle 104.

Determining the control input (described below) can be subject to a third constraint. The third constraint can be that the control input is below a maximum value, e.g., as represented by the following equation:

$$|u| \leq u_{max}$$

in which $u$ is the control input and $u_{max}$ is the maximum value. The maximum value $u_{max}$ can be chosen based on the capabilities of the component of the vehicle 100 that is controlled by the input, e.g., the brake system 110 and/or the steering system 112.

The computer 102 can be programmed to determine the control input $u$ based on the first and second control barrier functions $h_H$, $h_T$. For example, determining the control input $u$ can include minimizing a function of a difference between the control input $u$ and the nominal input $u_{nom}$. For example, determining the control input $u$ can include solving a quadratic program based on the first and second control barrier functions $h_H$, $h_T$, e.g., subject to the first and second constraints. Quadratic programming means solving optimization problems formulated as quadratic functions. For example, solving the quadratic program can include minimizing a square of the difference between the control input $u$ and the nominal input $u_{nom}$ subject to the first, second, and third constraints above, e.g., as represented by the following formula:

$$\min_{u \in \mathbb{R}^m} \|u - u_{nom}\|_2^2$$

in which $\mathbb{R}^m$ is the set of m-length vectors of real numbers. For example, if the control input $u$ includes the speed $v_H$ of the vehicle 100 and the steering angle $\delta$, then the length m of the vector of the control input $u$ is 2.

In the event of multiple obstacles 104, the computer 102 can be programmed to determine the control input $u$ based on the first and second control barrier functions $h_H$, $h_T$, for all or a subset of the obstacles 104. For example, if three obstacles 104 are present, determining the control input $u$ can include solving a quadratic program as described above subject to three first constraints (one for each obstacle 104), three second constraints (one for each obstacle 104), and the third constraint.

The computer 102 can be programmed to actuate the component of the vehicle 100, e.g., the brake system 110 and/or steering system 112, according to the control input $u$. For example, the computer 102 can be programmed to actuate the component according to the control input $u$ in response to the computer 102 determining the control input $u$ and to actuate the component according to the nominal input $u_{nom}$ otherwise. For example, the computer 102 can be programmed to determine the control input $u$ and actuate the component according to the control input $u$ in response to the vehicle 100 being in a reverse gear, and to actuate the component according to the nominal input $u_{nom}$ in response to the vehicle 100 being in a gear other than the reverse gear.

Figure 3:
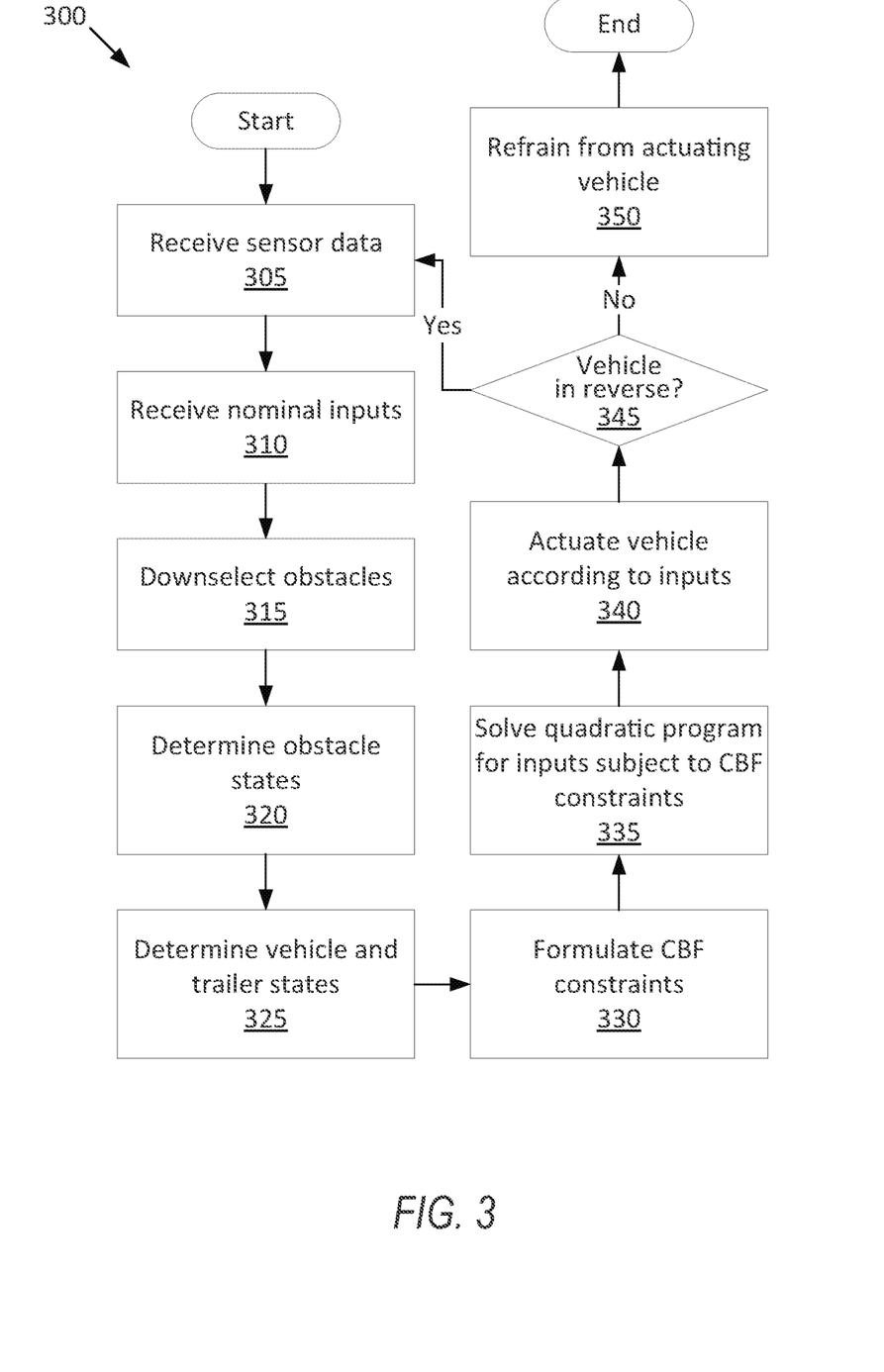
FIG. 3 is a process flow diagram of an example process for controlling the vehicle.

FIG. 3 is a process flow diagram illustrating an exemplary process 300 for controlling the vehicle 100. The memory of the computer 102 stores executable instructions for performing the steps of the process 300 and/or programming can be implemented in structures such as mentioned above. The computer 102 can be programmed to initiate the process 300 in response to the vehicle 100 being put into the reverse gear. As a general overview of the process 300, the computer 102 receives data from the sensors 114, receives the nominal input $u_{nom}$, downselects the obstacles 104 present in the sensor data, determines the obstacle kinematic states, determines the vehicle kinematic state and trailer kinematic state, formulates the first and second constraints, solves the quadratic program for the control input $u$ subject to the three constraints, and actuates the component of the vehicle 100 according to the control input $u$. The computer 102 repeatedly performs these steps while the vehicle 100 remains in the reverse gear. In response to the vehicle 100 being put in a gear other than the reverse gear, the computer 102 refrains from actuating the component according to the control input u.

The process 300 begins in a block 305, in which the computer 102 receives the sensor data from the sensors 114 indicating the obstacles 104.

Next, in a block 310, the computer 102 receives the nominal input $u_{nom}$.

Next, in a block 315, the computer 102 downselects the obstacles 104 present in the sensor data, i.e., reduces the number of obstacles 104 under consideration. For the purposes of this disclosure, downselection is selecting a subset of items from a typically larger set of items. For example, the computer 102 can select the five closest obstacles 104 to the vehicle 100, e.g., with the smallest values for $r_H$, and the five closest obstacles 104 to the trailer 106, e.g., with the smallest values for $r_T$. The obstacles 104 closest to the vehicle 100 and to the trailer 106 may overlap, so the downselection can result in five to ten obstacles 104 in this example. Downselection can save processing time for the computer 102 when combined with determining the control input u based on the first and second control barrier functions $h_H$, $h_T$ by capping the number of times that the control input u is solved for.

Next, in a block 320, the computer 102 determines the obstacle kinematic states for the downselected obstacles 104, as described above.

Next, in a block 325, the computer 102 determines the vehicle kinematic state and the trailer kinematic state, as described above.

Next, in a block 330, for each downselected obstacle 104, the computer 102 formulates the first and second control barrier functions $h_H$, $h_T$, and the computer 102 determines the first and second constraints based on the first and second control barrier functions $h_H$, $h_T$, as described above.

Next, in a block 335, the computer 102 determines the control input u based on the first and second control barrier functions $h_H$, $h_T$ for the downselected obstacles 104, as described above.

Next, in a block 340, the computer 102 actuates the component of the vehicle 100, e.g., the brake system 110 and/or the steering system 112, according to the control input u, as described above, e.g., for the control input u having the most extreme value. The most extreme value of the control input u can correspond to the obstacle 104 needing to be avoided from among the downselected obstacles 104.

Next, in a decision block 345, the computer 102 determines whether the vehicle 100 is in the reverse gear. In response to the vehicle 100 being in the reverse gear, the process 300 returns to the block 305 to restart the process 300, i.e., to repeatedly perform (i.e., loop through) the blocks 305-340 while the vehicle 100 is in the reverse gear. In response to the vehicle 100 being in a gear other than the reverse gear, the process 300 proceeds to a block 350.

In the block 350, the computer 102 refrains from actuating the component of the vehicle 100, e.g., the brake system 110 and/or the steering system 112, according to the control input u. For example, the computer 102 can actuate the component according to the nominal input $u_{nom}$. For another example, the computer 102 can refrain from actuating the component at all, e.g., if the vehicle 100 has been turned off. After the block 350, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive sensor data indicating an obstacle;
   formulate a first control barrier function for a vehicle based on the sensor data;
   formulate a second control barrier function for a trailer hitched to the vehicle based on the sensor data;
   determine a control input based on the first and second control barrier functions; and
   actuate a component of the vehicle according to the control input.

2. The computer of claim 1, wherein the component of the vehicle includes a brake system.

3. The computer of claim 1, wherein the component of the vehicle includes a steering system.

4. The computer of claim 1, wherein determining the control input includes solving a quadratic program based on the first and second control barrier functions.

5. The computer of claim 1, wherein determining the control input is based on minimizing a function of a difference between the control input and a nominal input.

6. The computer of claim 5, wherein the nominal input is a current value of input.

7. The computer of claim 5, wherein the instructions further include instructions to receive the nominal input from an algorithm for autonomous operation of the vehicle.

8. The computer of claim 1, wherein determining the control input is subject to a first constraint based on the first control barrier function and a second constraint based on the second control barrier function.

9. The computer of claim 8, wherein the first constraint is that a sum of a time derivative of the first control barrier function and a first function of the first control barrier function exceeds a first value, and the second constraint is that a sum of a time derivative of the second control barrier function and a second function of the second control barrier function exceeds a second value.

10. The computer of claim 9, wherein the first function is locally Lipschitz continuous, and the second function is locally Lipschitz continuous.

11. The computer of claim 9, wherein the first function is strictly increasing and equal to zero when an argument of the first function is equal to zero, and the second function is strictly increasing and equal to zero when an argument of the second function is equal to zero.

12. The computer of claim 9, wherein the first function and the second function are the same.

13. The computer of claim 9, wherein the first value is zero, and the second value is zero.

14. The computer of claim 8, wherein the control input is subject to a third constraint, and the third constraint is that the control input is below a maximum value.

15. The computer of claim 1, wherein actuating the component according to the control input occurs in response to the vehicle being in a reverse gear.

16. The computer of claim 15, wherein the instructions further include instructions to refrain from actuating the component according to the control input in response to the vehicle being in a gear other than the reverse gear.

17. The computer of claim 1, wherein the instructions further include instructions to, while the vehicle is in a reverse gear, repeatedly (a) formulate the first and second control barrier functions, (b) determine the control input subject to the first and second control barrier functions, and (c) actuate the component according to the control input.

18. The computer of claim 1, wherein the instructions further include instructions to determine a vehicle kinematic state of the vehicle and a trailer kinematic state of the trailer, the first control barrier function is based on the vehicle kinematic state, and the second control barrier function is based on the trailer kinematic state.

19. The computer of claim 18, wherein the trailer kinematic state is dependent on the vehicle kinematic state.

20. A method comprising:
   receiving sensor data indicating an obstacle;
   formulating a first control barrier function for a vehicle based on the sensor data;
   formulating a second control barrier function for a trailer hitched to the vehicle based on the sensor data;
   determining a control input based on the first and second control barrier functions; and
   actuating a component of the vehicle according to the control input.

* * * * *